Sept. 22, 1970          A. F. WIEBE          3,530,075
PHOTOCHROMIC COMPOSITIONS
Filed Nov. 1, 1967
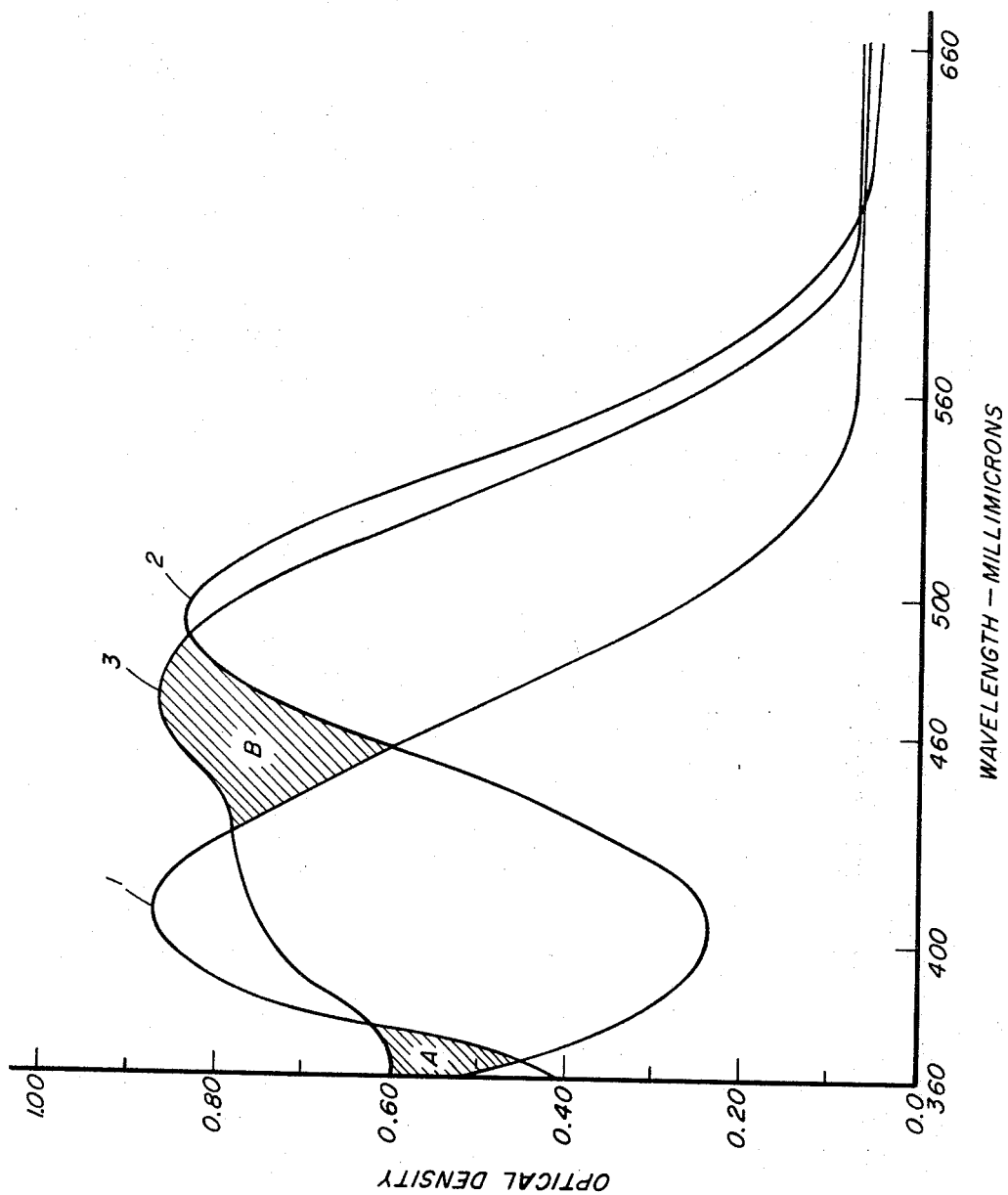
INVENTOR.
ALWYN FREDERICK WIEBE
BY *Frank M. Van Riet*
ATTORNEY United States Patent Office 3,530,075
Patented Sept. 22, 1970

3,530,075
PHOTOCHROMIC COMPOSITIONS
Alwyn Frederick Wiebe, Ridgefield, Conn., assignor to American Cyanamid Company, Stamford, Conn., a corporation of Maine
Filed Nov. 1, 1967, Ser. No. 679,740
Int. Cl. F21v 9/00; G02b 5/20
U.S. Cl. 252—300                                        10 Claims

ABSTRACT OF THE DISCLOSURE

Photochromic compositions of matter comprising a polymeric matrix having a combination of two members of two specific classes of photochromic materials dispersed throughout the body thereof are disclosed.

BACKGROUND OF THE INVENTION

This invention relates to compositions of matter comprising a polymeric matrix which has two photochromic materials dispersed throughout the body thereof. The invention described hereinafter is generally in the field of information display, data processing, electro-optical communication devices, etc.

Previous to my invention, various photochronic materials were known to behave photochromically when dispersed throughout the body of polymeric materials. U.S. Pat. Nos. 3,329,648; 3,329,502; 3,322,678, etc., for example, teach the incorporation of solid state and liquid state photochromic materials into various polymeric systems. These prior art systems, while excellent for various specific uses such as eyeglass lenses, automobile windshields, etc., suffer various deficiencies which have now been overcome by my novel compositions.

SUMMARY

My novel compositions of matter, as mentioned above, comprise the incorporation of two different photochromic materials into a polymeric medium. The prior systems produced by incorporating merely one photochromic material into a polymeric medium are replete with problems during the utilization thereof, the worst of which limits the ultimate polymeric compositions to utilities wherein only a narrow band-width-absorption results from the photochromic activity of the incorporated material. Therefore, the composition, when activated, is only useful in applications wherein the screening out of that specific narrow band-width is desired.

Furthermore, the mere haphazard intermingling of two photochromic materials does not necessarily result in a useful device because many photochromic materials tend to cancel each other out in regard to their color change when activated by the same or different wavelengths of light.

I have now found a unique combination of two specific classes of photochromic materials which, when incorporated into a polymeric matrix and activated, produces a broad absorption band over the 360–380 mµ and 430–490 mµ by-passes.

The near neutral spectral absorption of my compositions is useful for light modulation over a significant portion of the visible spectrum and the compositions are therefore excellently suited for photographic uses.

The relatively flat spectrum of my novel compositions extends the spectral region over which a single composition of matter may be used. The region is substantially identical to the sensitivity spectrum of bromide-type photographic paper and hence the compositions can be utilized in photography in conjunction with existing apparatus or other photographic devices. For example, my novel compositions can be utilized as an attenuating medium in photographic printing processes without the use of filters to restrict the printing light to a narrow band-pass which is necessary when single phase photochromic systems are used, thereby increasing printing speeds by the disposal of the filter means.

BRIEF DESCRIPTION OF THE DRAWING

A graphic illustration of the broad absorption band of a composition according to my invention is shown.

In the figure, a plot is made of the absorption bands of two individual photochromic materials useful in the instant invention. Absorption band 1 is that of the compound 2,2(1-H)-xanthenedicarbonitrile, 1 - hydroxy - 4-methyl-9-oxo-1-phenyl and absorption band 2 is that of the compound 1-methoxy-1-(o-methoxyphenyl)-4-phenyl-2,2(1-H)dibenzofurandicarbonitrile. The absorption band representing a combination of 2.13% of the first compound and 1.36% of the second compound in cellulose acetate butyrate is shown by the numeral 3. This composition is that produced in Example 1, hereinbelow. As can be seen, the absorption band of the combined compounds is relatively flat as compared to those of the two compounds individually. As a result, the resultant composition is active in absorbing light over the spectrum of from about 360–500 mµ. The shaded sections represented by letters A and B show the increased area covered by my novel compositions.

DESCRIPTION OF THE INVENTION INCLUDING PREFERRED EMBODIMENTS

The first of the two classes of photochromic materials which are incorporated into the polymeric medium according to the instant invention is represented by the formula:

(I)
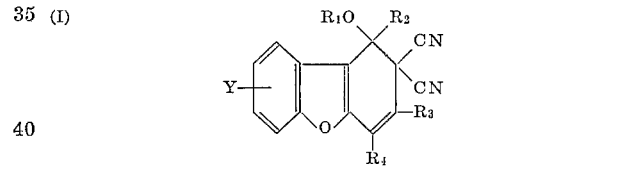

wherein Y is hydrogen, hydroxy, alkoxy, alkyl, alkylthio, cyano, nitro, amino, halogen, trifluoromethyl, or acyl; $R_1$ is acyl or alkyl; $R_2$ and $R_4$ are alkyl, aryl, or substituted aryl wherein the substituents are alkyl, alkoxy, alkylthio, cyano, nitro, amino, halogen or trifluoromethyl; and $R_3$ is hydrogen, alkoxy, amino, cyano, or the same as $R_2$ or $R_4$.

The second class of useful photochromic compounds which are incorporated into polymeric materials to produce my novel compositions of matter is represented by the formula:

(II)
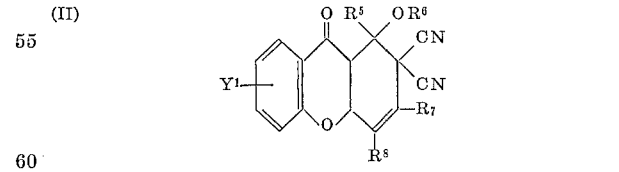

wherein $Y^1$ is hydrogen, alkyl, phenyl, alkyl-substituted phenyl, hydroxy, alkoxy, alkylthio, acyloxy, cyano, nitro, amino, halogen or trifluoromethyl; $R^6$ is hydrogen or acyl; $R^5$ and $R^8$ are alkyl, phenyl or substituted phenyl wherein the substituents are alkyl, hydroxy, alkoxy, alkylthio, cyano, nitro, amino, halogen or trifluoromethyl and $R^7$ is hydrogen, alkyl, phenyl or cyano.

Both classes of compounds represented by Formulae I and II, above, as well as methods for their preparation can be found in one or more of copending cases, Ser. No. 550,629, filed May 17, 1966 by Csapilla, now Pat. No. 3,470,211; Ser. No. 588,702, filed Oct. 24, 1966 by Huffman et al., now abandoned or Ser. No. 418,337, filed Dec. 14, 1964 by Loy et al., now abandoned, which applications are hereby incorporated herein by reference.

The amount of either photochromic material employed in my novel compositions of matter may range from about 0.1% to about 10.0%, by weight, based on the total weight of the composition, the combined concentration of the two materials being not more than about 20.0%, by weight, same basis.

Any polymeric material, synthetic or naturally occurring, may be used herein. Evidence of the types of polymers useful in my invention can be obtained from the more detailed description thereof set forth immediately hereinbelow.

Examples of resinous materials which may be utilized in the preparation of the compositions of the present invention are the various esters of acrylic acid and methacrylic acid, e.g., those having the formula:

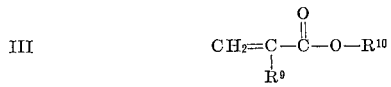

III wherein $R^9$ is hydrogen or a mthyl radical and $R^{10}$ is an alkyl radical having from 1 to 6 carbon atoms, inclusive. Compounds which are represented by Formula III and consequently may be used as monomers from which the polymers used in the present invention may be produced include methyl acrylate, ethyl acrylate, n-propyl acrylate, isopropyl acrylate, n-butyl acrylate, isobutyl acryate, t-butyl acrylate, n-amyl acrylate, isoamyl acrylate, t-amyl acrylate, hexyl acrylate, methyl methacrylate, ethyl methacrylate, n-propyl methacrylate, isopropyl methacrylate, n-btuyl methacrylate, isobutyl methacrylate, t-butyl methacrylate, n-amyl methacrylate, isoamyl methacrylate, t-amyl methacrylate, hexyl methacrylate and the like.

Other polymers which may be employed are those produced from styrene monomers, e.g., those having the formula:

(IV)

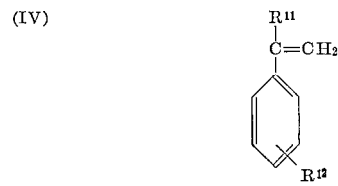

wherein $R^{11}$ is hydrogen or a lower alkyl radical having 1 to 4 carbon atoms, inclusive, and $R^{12}$ is hydrogen, a lower alkyl radical having 1 to 4 carbon atoms, inclusive, or a halogen radical. Suitable monomers represented by Formula IV include styrene, methyl styrene, ethyl styrene, propyl styrene, o-, m-, or p-butyl styrene, o-, m-, or p-chloro styrene, o-, m-, or p-bromo styrene, o-, m-, or p-fluoro styrene, o-, m- or p-iodo styrene, α-methyl styrene, α-ethyl styrene, α-butyl styrene, α-methyl-o, m or p-methylstyrene, α-methyl-o, m or p-ethylstyrene, α-butyl-o, m or p-ethylstyrene, α-ethyl-o, m or p-chlorostyrene, α-propyl-o, m or p-iodostyrene and the like.

Further examples of polymers which may be utilized to produce the novel compositions of the present invention include polymers of acrylonitrile, polymers of acrylamide, polymers of vinyl halides such as poly(vinyl chloride); poymers of vinylidene halides such as poly(vinylidene chloride); polymers of vinyl carbonate, and vinyl alcohol; vinyl acetate, vinyl butyral; various aldehydes, such as oxymethylene, acetaldehyde, crotonaldehyde; polymers of ethyleneoxide, cellulose polymers such as cellulose acetate butyrate, cellulose triacetate and the like.

Additionally, the monomers represented by Formulae III and IV above, and which are disclosed hereinabove as useful for producing homopolymers can be copolymerized either singly or in a plurality (two, three, four or any desired number), the latter often being desirable in order to improve the compatability and copolymerization characteristics of mixtures of monomers from the same class or various other copolymerizable monomers to obtain copolymers having the particular properties desired for the particular service application. Examples of such monomers which are useful herein as copolymers with the above discussed monomers or as homopolymers per se are the unsaturated alcohol esters, more particularly the allyl, methallyl, 1-chloroallyl, 2-chloroallyl, cinnamyl, vinyl, methvinyl, 1-phenylallyl, etc., esters of saturated aliphatic and aromatic monobasic and polybasic acids such, for instance, as acetic, propionic, butyric, valeric, caproic, oxalic, malonic succinic, glutaric, adipic, pimelic, suberic, azelaic, sebacic, benzoic, phenylacetic, phthalic, terephthalic, benzoylphthalic, etc., acids; vinyl naphthalene, vinylcyclohexane, vinyl furane, vinyl pyridine, vinyl dibenzofuran, divinyl benzene, trivinyl benzene, allyl benzene, diallyl benzene, N-vinyl carbzaole, unsaturated ethers, e.g., ethyl vinyl ether, diallyl ether, ethyl methallyl ether, etc.; unsaturated amides, for instance, N-allyl caprolactam, N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Thermoplastic or thermosetting polyesters may also be used in the practice of the instant invention. They are all well known in the art and are prepared by reacting polycarboxylic acids, or their anhydrides, with polyhydric alcohols. The thermosetting polyesters are prepared using a procedure wherein at least one of the reactive components contains α,β-ethylenic unsaturation. By following this procedure, resinous, essentially linear esterification or condensation products, containing a plurality of ethylenically unsaturated linkages distributed along the backbones of their polymer chains, are produced.

The use of α,β-ethylenically unsaturated polycarboxylic acids provides a convenient method of introducing ethylenic unsaturation into the polyester resins. It is preferred to employ α,β-ethylenically unsaturated dicarboxylic acids, such as maleic, fumaric, citraconic, γ,γ-dimethylcitraconic, mesaconic, itaconic, α-methylitaconic, γ-methylitaconic, teraconic, and the like, as well as mixtures thereof, but minor amounts of α,β-ethylenically unsaturated polycarboxylic acids containing three or more carboxyl groups, such as aconitic acid and the like, together with the particular α,β-ethylenically unsaturated dicarboxylic acid or acids chosen, may also be used.

Whenever available, the anhydrides of any of the aforementioned α,β-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and especially saturated aliphatic diols, are preferred as coreactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihyhydric alcohols which may be employed are saturated aliphatic diols such as ethylene glycol, propylene glycol, butylene glycol, diethylene gyco, dipropyene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

In forming the thermoplastic polyester resins useful herein, the above alcohols are reacted with non-polymerizable polycarboxylic acids, i.e. acids which are saturated or which contain only benzeneoid unsaturation, such as oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylene tetrahydrophthalic, and the like, as well as mixtures thereof.

These saturated acids may be used alone to form thermoplastic resins or in combination with the above-mentioned unsaturated acids in the formation of the thermosetting resins, in order to impart many beneficial properties thereto. For example, non-polymerizable polycarboxylic acids, having only two carboxyl groups, and no other reactive substituents, may be employed to impart a desirable degree of flexibility which may not be achieved by the use of the $\alpha,\beta$-ethylenically unsaturated polycarboxylic acids alone. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids may be employed in amounts ranging from about 25% to about 75% of the total equivalents of carboxyl groups present in the esterification mixture.

Halogenated unsaturated polycarboxylic acids may also be employed in the preparation of the thermosetting polyesters useful in the present invention for purposes of imparting various desirable properties thereto, as mentioned above in regard to the saturated acids. Examples of halogenated acids which may be used include monochloro- and monobromomaleic, monochloro- and monobromofumaric, monochloro- and monobromomalonic, dichloro- and dibromomalonic, monochloro- and monobromosuccinic, $\alpha,\beta$-dichloro- and dibromosuccinic, hexachloroendomethylenetetrahydrophthalic, and the like, as well as mixtures thereof. Whenever available, the anhydrides of any of these halogenated acids may also be substituted therefor in whole or in part.

Among the halogenated polyols that may be employed are 2,2'-chloromethylpropanediol-1,3, adducts of hexachlorocyclopentadiene with unsaturated polyols, such as butendiols, pentendiols, and the like, and adducts of hexachlorocyclopentadiene with polyols having three or more hydroxyl groups, one of which is etherified with an unsaturated alcohol reactive with hexachlorocyclopentadiene. Among the latter compounds such as 3 - [1,4,5,6,7,7 - hexachlorobicyclo - (2.2.1)-5-hepten-2-yloxy]-1,2,-propanediol, which is the adduct of hexachloro-cyclopentadiene with vinyl glycerol ether, 3-[1, 4,5,6,7,7 - hexachlorobicyclo(2.2.1) - 5 - hepten - 2 - yl]-methoxy-1,2-propanediol, which is the adduct of hexachlorocyclopentadiene with allyl glycerol ether, adducts of hexachlorocyclopentadiene with vinyl and allyl ethers of pentaerythritol, and the like. Mixtures of these halogenated polyols may also be employed, if desired.

The esterification mixtures, from which both the thermoplastic and the thermosetting polyester resins employed in the practice of the present invention are prepared, are generally formulated so as to contain at least a stoichiometric balance between carbonyl and hydroxyl groups. Thus, where a diol and a dicarboxylic acid are employed, they are usually reacted on at least a mol to mol basis. In common commercial practice, a small excess of polyol, usually in the range of from about 5% to about 15% excess, is employed. This is done primarily for economic reasons, i.e. to insure a rapid rate of esterification.

Both types of polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol.

The esterification mixture should be sufficiently reacted so as to ultimately produce a polyester resin having an acid number not appreciably more than about 75. It is preferred to employ polyester resins having acid numbers ranging from about 30 to about 50, or below.

Further details pertaining to the preparation of polyester resins of the types employed in the practice of the present invention are disclosed in U.S. Pat. No. 2,255,313, to Ellis, and in U.S. Pat. Nos. 2,443,735 to 2,443,741, inclusive, to Kropa, and these patents are hereby incorporated into the present application by reference.

The thermosetting polyester resins of the present invention, in combination with the photochromic compound mixture, may be cross-linked by the addition of a suitable cross-linking agent.

The thermosetting polyester resins are cross-linked by admixing them with a monomer compound containing the polymerizable $CH_2=C<$ group to give a composition that may be cured to a stable thermoset condition. One may use about 10 parts by weight of the monomeric material to about 90 parts by weight of the polyester resin up to about 60 parts of the monomeric material to abotu 40 parts of the polyester ersin .The preferred embodiment, however, is to use from about 25 parts of the monomeric material to about 35 parts of the monomeric material with about 75 parts to about 65 parts, respectively, of the polyester resin.

The monomeric material containing the polymerizable $CH_2=C<$ group which may be used in the practice of the persent invention, has a boiling point of at least 60° C. Among the polymerizable monomeric materials that will fined use in my invention aer styrene, sidechain alkyl and halo substituted styrenes such as alpha methylstyrene, alpha chlorostyrene, alpha ethylstyrene and the like or alkyl and halo ring-substituted styrenes such as ortho, meta and paraalkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, liallyl adipate, diallyl subacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

Additionally, cyanoethylated cellulosic materials such as those produced from the cellulose of wood pulp or wood fiber, alpha-cellulose flock, viscose, cotton linters, cotton, jute, ramey, linen, and the like in such forms as fibers, yarns fabrics, raw stock, batting, and the like, may be used in my novel compositions. Generally, materials of this type possess, after cyanoethylation by various known procedures, a nitrogen content of as high as 13% and a degree of substitution of up to about 3. A nitrogen content of at least 10% and a corresponding degree of substitution of about 2.3 is generally considered average. Procedures for the production of such materials, as well as the products per se, are shown in U.S. Pats. 2,375,847, 2,840,446, 2,786,736, 2,860,946, 2,812,999.

As further examples of polymeric materials which may be used to produce my novel compositions of matter are the polyamide resins, i.e., thos produced from a dibasic acid and a polyamine. Polyamide resins of this type are well known in the art and are generally termed "nylon" resins. These nylon resins, as used in the instant specification, are long chain synthetic polymeric amides which have recurring amide groups as an integral part of the main polymer chain and which are capable of being formed into a filament in which the structural elements are oriented in the direction of the axes. Most common of these nylons or polyamides are obtained by condensation of a diamine with a dicarboxylic acid or by autocondensation of an amino acid. These polyamides have the structural formula:

(V) 

$x$ and $y$ being greater than one. Methods for the production of polyamides of this type are shown, for example, in the following patents: U.S. Pat. Nos. 2,191,556; 2,293,760; 2,293,761; 2,327,116; 2,359,877; 2,377,985; 2,572,843, said patents hereby being incorporated herein by reference.

Additionally, I may utilize such polymeric materials as the polyurethanes. Any polyester based or polyether based polyurethane resin may be used in the present invention. Among the reactive organic polyfunctional polyols employed in preparing one class of polyurethane resins used in the practice of my invention by reaction with a suitable isocyanate compound are the polyalkylene ether, thioether, and ether-thioether glycols represented by the general formula:

(VI) 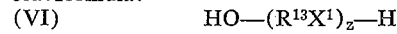

wherein $R^{13}$ represents the same or different alkylene radicals containing up to about 10 carbon atoms, $X^1$ represents oxygen or sulfur, and $z$ is an integer large enough so that the molecular weight of the polyalkylene ether, thioether, or ether-thioether glycol is at least about 500, e.g., from about 500 to about 10,0000. The polyalkylene ether glycols included within this general fromula, such as polyethylene glycols, polypropylene glycols, polybutylene glycols, polytetramethylene glcols, polhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylene-arylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, with a polycarboxylic acid or anhydride in the same manner as set forth hereinabove in regard to the dissertation on applicable polyester resins which may be used hereni, with the same examples of reactants applying in both instances.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or les. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

The polyurethane resins useful as a component of my novel compositions may be prepared using a wide variety of organic polyisocyanates, among which there are included aromatic diisocyanates, such as m-phenylenediisocyanate,
p-phenylenediisocyanate,
4-t-butyl-m-phenylenediisocyanate,
4-methoxy-m-phenylenediisocyanate,
4-phenoxy-m-phenylenediisocyanate,
4-chloro-m-phenylenediisocyanate, toluenediisocyanates either as a mixture of isomers, e.g., the commercially available mixture of 80% 2,4-toluenediisocyanate and 20% 2,6-toluenediisocyanate, or as the individual isomers themselves, m-xylylenediisocyanate,
p-xylylenediisocyanate,
cumene-2,4-diisocyanate,
durenediisocyanate,
1,4-naphthylenediisocyanate,
1,5-naphthylenediisocyanate,
1,8-naphthylenediisocyanate,
2,6-naphthylenediisocyanate,
1,5-tetrahydronaphthylenediisocyanate,
p,p'-diphenyldiisocyanate,
diphenylmethane-4,4'-diisocyanate,
2,4-diphenylhexane-1,6-diisocyanate,
"bitolylenediisocyanate" (3,3'-dimethyl-4,4'-biphenylenediisocyanate),
"dianisidinediisocyanate" (3,3'-dimethoxy-4,4'-biphenylenediisocyanate), and polymethylenepolyisocyanates represented by the general formula:

(VII) 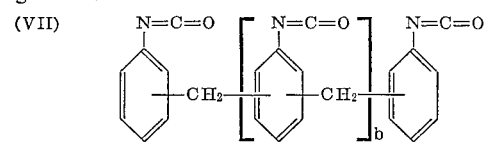

wherein $b$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-$\omega,\omega'$-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Pats. 2,729,618, 3,016,364 and the like. Aminoplast resins may also be employed in the practice of the instant invention. These materials are synethtic resins prepared by the condensation reaction of an amino (including imino) or amido (including imido) compound with an aldehyde. Resinous condensates of this type, as well as methods for their preparation, have been shown innumerable times in the prior art, and adequate disclosure of them may be found in, for example, U.S. Pat. Nos. 2,197,357; 2,310,004 and 2,328,592 to Widmer et al. and 2,260,239 to Talbot. Aminoplast resins of the type wherein one or more aminotriazines containing at least two amidogen groups, each having at least one aldehyde-reactable hydrogen atom attached to the amidogen nitrogen atom, e.g., melamine have been reacted with an aldehyde, such as formaldehyde, to yield a thermosetting resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form, are preferred.

Melamine is the preferred aminotraizine reactant for preparing the heat-curable or potentially heat-curable partially polymerized aminotriazine-aldehyde resinous reaction products which may be used in the practice of the present invention, but other aminotriazines, e.g., mono-, di- and tri-substituted melamines, such as the mono-, di and tri-methylmelamines, and the like; guanamines, such as formoguanamine, acetoguanamine, benzoguanamine, and the like, as well as mixtures of aminotriazines, may be utilized as reactants. Similarly, formaldehyde, preferably in aqueous solution, is the preferred aldehyde reactant, but other aldehydes, e.g., acetalydehyde, propionaldehyde, butyraldehyde, benzaldehyde, and the like, or compounds engenderingaldehydes, e.g., paraformaldehyde, hexamethylenetetramine and the like, may also be employed. The properties desired in the finished product and economic considerations are among the elements which will determine the choice of the particular aminotriazine and aldehyde employed.

The mol ratio of adehyde to aminotriazine in such resinous reaction products is not critical, and may be within the oder of from about 1.5:1 to about 4:1, respectively, depending on he nature of the starting materials and the characteristics desired in the final product, but it is preferred that the mol ratio be within the order of from about 2:1 to about 3:1, respectively.

Conventional reaction conditions are observed in preparing the aminotriazine-aldehyde resins, i.e., the aldehyde and aminotriazine may be heat-reacted at temperatures ranging from about 40° C. to reflux temperature, i.e., about 100° C., for periods of time ranging from about 30 to 120 minutes, at a pH ranging from about 7.0 to 10, preferably in an aqueous medium. Any substance yielding acidic or alkaline aqueous solutions may be used to regulate the pH, for example, alkaline materials such as alkali metal or alkaline earth metal oxides, e.g., sodium, potassium or calcium hydroxide or sodium or potassium carbonate; mono-, di- or tri-alkylamines, e.g., ethanolamine, triethylamine or triethanolamine; alkylene polyamines or polyalkylene polyamines, e.g., 3,3′-iminobispropylamine and the like.

I may also employ other amido or imido compounds having at least two aldehyde-reactable hydrogen atoms atoms attached to amidogen nitrogen atoms besides the aminotriazines in preparing the aminoplast resins used in the present invention. For example, I may employ urea and those of its derivatives which have been commonly used in the preparation of aminoplast resinous compositions, such as for example the alkylureas, e.g., mono- and dimethylurea, halourea, and the like.

The properties of the thermosetting aminoplast resins can be further modified, if desired, by incorporating various other substances into the aminotriazine-aldehyde resins. Included among such substances are plasticizers such as the α-alkyl-D-glucosides, e.g., α-methyl-D-glucoside, disclosed in U.S. Pat. No. 2,773,848 to Lindenfelser, methylol derivatives corresponding to the general formula:

(VIII) 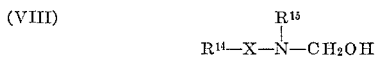

wherein $R^{14}$ represents an alkyl, aryl or aralkyl group, $R^{15}$ represents a hydrogen atom or an alkyl, alkylol, aryl or acyl groups, and X represents —$SO_2$— or —C—, e.g., N-methylol p-toluenesulfonamide (which may be formed in situ by the addition of p-toluene sulfonamide to an amidogen-formaldehyde reaction mixture) and the like, or combinations of these glucosides and methylol derivatives, e.g., a mixture of α-methyl-D-glucoside and p-toluenesulfonamide, as disclosed in U.S. Pat. No. 2,773,-788 to Magrane et al.

The photochromic materials, alone or in admixture, may be incorporated into the polymeric material before, after, or during the production thereof, the particular time or method of incorporation forming no part of my invention.

It is preferred to first dissolve the polymeric material in a suitable solvent and then add the photochromic materials to the resultant solution. If a solution cannot be formed of the polymeric material, or if for some other reason a solution is less desirable, the photochromic materials and the polymeric material may be blended using known procedures such as a ball mill, a tumbler mixer, hot rolls, emulsion blending techniques, Banbury mixers, Waring Blendors and the like. Another procedure which may be employed is known as a devolatilization-extrusion method, wherein separate streams of the polymer and photochromic material are subjected to mixing, compounding, devolatilization and extrusion in commercially available devices. In the devolatilizer-extruder, the mixture is worked in a chamber under heat and vacuum so that new surfaces of the polymer mixture are continuously and rapidly exposed to vacuum to remove the solvent before extruding the product. The term "devolatilization," as herein employed, refers to the step in which the non-resinous volatile material is removed from the polymer. The apparatus which simultaneously devolatilizes and extrudes the material comprises a chamber with one or more screws having a close tolerance with the wall for compounding the material in its passage therethrough, and at least one vacuum chamber for removing the volatile components of the mixture.

The terms "photochromic compound," "photochromic substance" or "photochromic material," as used in the instant disclosure, mean compounds, substances, or materials which change their transmission or reflectance upon being subjected to ultraviolet or visible irradiation and subsequently revert to their orignal state upon subjection thereof to a different wavelength of radiation, or removal of the initial ultraviolet source.

The novel compositions of the present invention are capable of being molded, cast, etc. by all known techniques, but different items, such as lenses, windshields, filters and the like.

The following examples are set forth for purposes of illustration only and are not to be construed as limiting the instant invention except as set forth in the appended claims. All parts and percentages are by weight unless otherwise specified.

Example 1

To a suitable blending vessel is added a 50/50 solvent mixture of toluene and methyl ethyl ketone. Ten percent, by weight, of cellulose acetate butyrate is then added and allowed to dissolve. When dissolved, a flow agent is added, followed by 2.13% of 2,2(1H)xanthenedicarbonitrile, 1-hydroxy-4-methyl-9-oxo-1-phenyl and 1.36% of 1-methoxy-1-(o-methoxyphenyl)-4-phenyl-2,2(1H) dibenzofurandicarbonitrile. When the additives are all in solution, the resultant lacquer is filtered. A film, .05 mil thick, is then drawn down on a piece of glass and the solvent mixture is allowed to evaporate off at 60° C.

The resultant coating is then subjected to ultraviolet light. The colorless film turns blue and reverts to its colorless state upon removal of the light.

The absorption band of the film is measured and conforms to the band shown in the drawing as line 3.

Two additional films are then made of the cellulose acetate butyrate. The first contains only the 2.13% of the xanthene compound and the second contains only the 1.36% of the furan compound.

The adsorption bands of these two films are then measured by subjecting the film to ultraviolet light. The bands are represented by lines 1 and 2, respectively, of the drawing.

Following the procedure of Example 1, various other compounds represented by Formulae I and II, above, are added to various polymeric materials in varying amounts. The results in each instance are similar to those of Example 1. The various compositions produced are set forth in Table I, below.

TABLE I

| Ex. | Polymer Matrix | Dibenzofurandicarbonitrile [1] | Percent Conc. | Xanthenedicarbonitrile [2] | Percent Conc. |
|---|---|---|---|---|---|
| 2 | Poly(methyl methacrylate) | $R_1$=methyl<br>$R_2$=2,4-dimethoxyphenyl<br>$R_3$=hydrogen<br>$R_4$=phenyl<br>Y=hydrogen | 1.0 | $R_5$=phenyl<br>$R_6$=hydrogen<br>$R_7$=hydrogen<br>$R_8$=methyl<br>$Y_1$=hydrogen | 2.0 |
| 3 | Polystyrene | $R_1$=methyl<br>$R_2$=o-fluorophenyl<br>$R_3$=hydrogen<br>$R_4$=phenyl<br>Y=hydrogen | 5.0 | $R_5$=p-methoxyphenyl<br>$R_6$=hydrogen<br>$R_7$=hydrogen<br>$R_8$=methyl<br>$Y_1$=hydrogen | 2.5 |
| 4 | Polyvinyl chloride | $R_1$=acetyl<br>$R_2$=o-methoxyphenyl<br>$R_3$=cyano<br>$R_4$=phenyl<br>Y=hydrogen | 9.0 | $R_5$=phenyl<br>$R_6$=acetyl<br>$R_7$=hydrogen<br>$R_8$=methyl<br>$Y_1$=hydrogen | 1.0 |
| 5 | Thermoplastic polyester resin [3] | $R_1$=acetyl<br>$R_2$=o-fluorophenyl<br>$R_3$=cyano<br>$R_4$=phenyl<br>Y=hydrogen | 10.0 | $R_5$=phenyl<br>$R_6$=hydrogen<br>$R_7$=cyano<br>$R_8$=methyl<br>$Y_1$=hydrogen | 0.5 |
| 6 | Polyamide resin [4] | $R_1$=acetyl<br>$R_2$=2-methoxy-5-nitrophenyl<br>$R_3$=cyano<br>$R_4$=phenyl<br>Y=6-nitro | 1.5 | $R_5$=p-methoxyphenyl<br>$R_6$=acetyl<br>$R_7$=hydrogen<br>$R_8$=ethyl<br>$Y_1$=6-dimethylamino | 2.0 |
| 7 | Polyurethane resin [5] | $R_1$=ethyl<br>$R_2$=o-methoxyphenyl<br>$R_3$=ethoxy<br>$R_4$=p-chlorophenyl<br>Y=6-bromo | 5.0 | $R_5$=p-cyanophenyl<br>$R_6$=propionyl<br>$R_7$=hydrogen<br>$R_8$=n-butyl<br>$Y_1$=6-phenyl | 5.0 |
| 8 | Polycarbonate [6] | $R_1$=methyl<br>$R_2$=phenyl<br>$R_3$=methoxy<br>$R_4$=p-trifluoromethylphenyl<br>Y=4-cyano | 7.0 | $R_5$=o-chlorophenyl<br>$R_6$=hydrogen<br>$R_7$=hydrogen<br>$R_8$=n-undecyl<br>$Y_1$=8-hydroxy | 1.0 |
| 9 | Poly(acrylic acid) | $R_1$=n-butyl<br>$R_2$=o-cyanophenyl<br>$R_3$=hydrogen<br>$R_4$=methyl<br>Y=4-methoxy | 1.5 | $R_5$=m-aminophenyl<br>$R_6$=acetyl<br>$R_7$=hydrogen<br>$R_8$=isopropyl<br>$Y_1$=7-trifluoromethyl | 3.5 |
| 10 | Cellulose triacetate | $R_1$=methyl<br>$R_2$=p-aminophenyl<br>$R_3$=phenyl<br>$R_4$=p-nitrophenyl<br>Y=5-amino | 0.1 | $R_5$=p-trifluoromethylphenyl<br>$R_6$=hydrogen<br>$R_7$=cyano<br>$R_8$=phenyl<br>$Y_1$=6-ethoxy | 0.5 |
| 11 | Styrene acrylonitrile copolymer (75/75) | $R_1$=methyl<br>$R_2$=methyl<br>$R_3$=amino<br>$R_4$=p-fluorophenyl<br>Y=4-trifluoromethyl | 4.0 | $R_5$=p-fluorophenyl<br>$R_6$=acyl<br>$R_7$=cyano<br>$R_8$=p-methylphenyl<br>$Y_1$=6-methyl | 1.0 |
| 12 | Poly(ethylacrylate) | $R_1$=methyl<br>$R_2$=o-fluorophenyl<br>$R_3$=hydrogen<br>$R_4$=phenyl<br>Y=hydrogen | 5.0 | $R_5$=phenyl<br>$R_6$=hydrogen<br>$R_7$=hydrogen<br>$R_8$=methyl<br>$Y_1$=hydrogen | 5.0 |
| 13 | Poly(acetaldehyde) | $R_1$=acetyl<br>$R_2$=o-methoxyphenyl<br>$R_3$=cyano<br>$R_4$=phenyl<br>Y=hydrogen | 1.5 | $R_5$=p-methoxyphenyl<br>$R_6$=hydrogen<br>$R_7$=hydrogen<br>$R_8$=methyl<br>$Y_1$=hydrogen | 3.5 |
| 14 | Poly(vinyl alcohol) | $R_1$=acetyl<br>$R_2$=o-fluorophenyl<br>$R_3$=cyano<br>$R_4$=phenyl<br>Y=hydrogen | 0.75 | $R_5$=phenyl<br>$R_6$=acetyl<br>$R_7$=hydrogen<br>$R_8$=methyl<br>$Y_1$=hydrogen | 1.75 |
| 15 | Poly(vinyl butyral) | $R_1$=acetyl<br>$R_2$=2-methoxy-5-nitrophenyl<br>$R_3$=cyano<br>$R_4$=phenyl<br>Y=6-nitro | 10.0 | $R_5$=p-trifluoromethylphenyl<br>$R_6$=hydrogen<br>$R_7$=cyano<br>$R_8$=phenyl<br>$Y_1$=6-ethoxy | 6.0 |

[1] = According to Formula I in specification.
[2] = According to Formula II in specification.
[3] = Commercially available polyester resin produced from 50% phthalic acid, 25% diethylene glycol and 25% dipropylene glycol.
[4] = Commercially available polyamide resin produced from hexamethylene diamine and adipic acid.
[5] = Commercially available polymethane resin product by reacting a polyester resin of diethylene glycol, hexane-diol-1,3 and phthalic acid with 2,4-toluenediisocyanate.
[6] = Commercially available carbonate resin produced by reacting phosgene with Bisphenol A to give product having a structure:

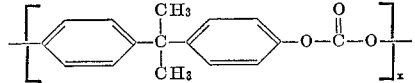

I claim:
1. A composition of matter comprising a polymeric material, having dispersed throughout the body thereof, (1) from about 0.1% to about 10.0%, by weight, based on the total weight of the composition, of a compound having the formula:

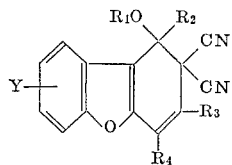

wherein Y is hydrogen, hydroxy, alkoxy, alkyl, alkylthio, cyano, nitro, amino, halogen, trifluoromethyl or acyl; $R_1$ is acyl or alkyl; $R_2$ and $R_4$ are alkyl, aryl, or substituted aryl wherein the substituents are alkyl, alkoxy, alkylthio, cyano, nitro, amino, halogen, or trifluoromethyl; and $R_3$ is hydrogen, alkoxy, amino cyano or the same as $R_2$ or $R_4$, and (2) from about 0.1% to about 10.0%, by weight, based on the total weight of the composition, of a compound having the formula:

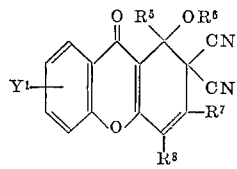

wherein $Y^1$ is hydrogen, alkyl, phenyl, alkyl substituted phenyl, hydroxy, alkoxy, alkylthio, acyloxy, cyano, nitro, amino halogen, or trifluoromethyl; $R^6$ is hydrogen or acyl; $R^5$ and $R^8$ are alkyl, phenyl or substituted phenyl wherein the substituents are alkyl, hydroxy, alkoxy, alkylthio, cyano, nitro, amino, halogen or trifluoromethyl; $R^7$ is hydrogen, alkyl, phenyl or cyano.

2. A composition according to claim 1 wherein compound (1) is 1-methoxy-1-(o-methoxyphenyl)-4-phenyl-2,2(1H)-dibenzofurandicarbonitrile.

3. A composition according to claim 1 wherein said compound (2) is 2,2(1H)-xanthenedicarbonitrile, 1-hydroxy-4-methyl-9-oxo-1-phenyl.

4. A composition according to claim 1 wherein said polymeric material is cellulose acetate butyrate.

5. A composition according to claim 1 wherein said polymeric material is cellulose acetate butyrate and said compound (1) is 1-methoxy-1-(o-methoxyphenyl)-4-phenyl-2,2(1H)-dibenzofurandicarbonitrile.

6. A composition according to claim 1 wherein said polymeric material is cellulose acetate butyrate and said compound (2) is 2,2(1H)-xanthenedicarbonitrile, 1-hydroxy-4-methyl-9-oxo-1-phenyl.

7. A composition according to claim 1 wherein said polymeric material is cellulose acetate butyrate, said compound (1) is 1-methoxy-1-(o-methoxyphenyl)-4-phenyl-2,2(1H)-dibenzofurandicarbonitrile and said compound (2) is 2,2(1H)-xanthenedicarbonitrile, 1-hydroxy-4-methyl-9-oxo-1-phenyl.

8. A composition according to claim 1 wherein said polymeric material is a polymer of methyl methacrylate.

9. A composition according to claim 1 wherein said polymeric material is a polymer of styrene.

10. A composition according to claim 1 wherein said polymeric material is a polymer of a vinyl halide.

References Cited
UNITED STATES PATENTS
3,405,137  10/1968  Csapilla _____ 260—329.3
3,470,211  9/1969   Csapilla _____ 260—346.2

GEORGE F. LESMES, Primary Examiner

M. B. WITTENBERG, Assistant Examiner

U.S. Cl. X.R.
96—90; 260—329.3, 345.3, 346.2